United States Patent
Li et al.

(10) Patent No.: US 12,494,199 B2
(45) Date of Patent: Dec. 9, 2025

(54) VOICE INTERACTION METHOD AND ELECTRONIC DEVICE

(71) Applicant: HUAWEI TECHNOLOGIES CO., LTD., Guangdong (CN)

(72) Inventors: Weiguo Li, Shenzhen (CN); Li Qian, Shenzhen (CN); Xin Jiang, Hong Kong (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 441 days.

(21) Appl. No.: 17/952,401

(22) Filed: Sep. 26, 2022

(65) Prior Publication Data
US 2023/0017274 A1 Jan. 19, 2023

Related U.S. Application Data

(63) Continuation of application No. PCT/CN2021/077514, filed on Feb. 23, 2021.

(30) Foreign Application Priority Data

Mar. 27, 2020 (CN) .......................... 202010232268.3

(51) Int. Cl.
*G10L 15/22* (2006.01)
*G10L 17/18* (2013.01)

(52) U.S. Cl.
CPC .............. *G10L 15/22* (2013.01); *G10L 17/18* (2013.01)

(58) Field of Classification Search
CPC ......... G10L 15/22; G10L 17/18; G10L 17/04; G10L 2021/105; G10L 13/033;
(Continued)

(56) References Cited

U.S. PATENT DOCUMENTS 6,987,841 B1 * 1/2006 Byers ................ H04M 3/42221
379/93.01
10,776,658 B2 * 9/2020 Ashbrook .............. G06V 20/20
(Continued)

FOREIGN PATENT DOCUMENTS

CN 107026943 A 8/2017
CN 110633357 A * 12/2019 ......... G06F 16/3343
(Continued)

OTHER PUBLICATIONS

European Extended Search report for U.S. Appl. No. 21/774,325 dated Feb. 20, 2023, 8 pages.
(Continued)

*Primary Examiner* — Hai Phan
*Assistant Examiner* — Ian Scott Mclean

(57) ABSTRACT

This application provides a voice interaction method and an electronic device, and relates to the field of artificial intelligence (AI) technologies and the field of voice processing technologies. An example solution includes: An electronic device receiving first voice information sent by a second user, and the electronic device recognizing the first voice information in response to receiving the first voice information. The first voice information is used to request a voice conversation with a first user. The electronic device may have, on a basis that the electronic device recognizes that the first voice information is voice information of the second user, a voice conversation with the second user by imitating a voice of the first user and in a mode in which the first user has a voice conversation with the second user.

20 Claims, 5 Drawing Sheets

(58) Field of Classification Search
CPC . G10L 21/10; G10L 13/027; G10H 2250/455; G10H 1/0091; G06F 16/90332; G06F 16/3343

See application file for complete search history.

(56) References Cited

U.S. PATENT DOCUMENTS

| | | | |
|---|---|---|---|
| 11,443,749 B2 * | 9/2022 | Choi | G06F 3/167 |
| 11,551,670 B1 * | 1/2023 | Smith | G10L 15/22 |
| 2011/0283190 A1 * | 11/2011 | Poltorak | G06F 3/167 |
| | | | 704/258 |
| 2020/0058288 A1 | 2/2020 | Lin et al. | |

FOREIGN PATENT DOCUMENTS

| | | | | |
|---|---|---|---|---|
| CN | 107026943 B | * | 4/2020 | H04M 3/2245 |
| CN | 108962217 B | * | 7/2021 | G10L 17/00 |
| WO | 2020024582 A1 | | 2/2020 | |

OTHER PUBLICATIONS

PCT International Search Report for Application No. PCT/CN2021/077514 dated Feb. 23, 2021, 9 pages.

\* cited by examiner

VOICE INTERACTION METHOD AND ELECTRONIC DEVICE

CROSS-REFERENCE TO RELATED APPLICATIONS

This application is a continuation of International Application No. PCT/CN2021/077514, filed on Feb. 23, 2021, which claims priority to Chinese Patent Application No. 202010232268.3, filed on Mar. 27, 2020. The disclosures of the aforementioned applications are hereby incorporated by reference in their entireties.

TECHNICAL FIELD

Embodiments of this application relate to the field of artificial intelligence technologies and the field of voice processing technologies, and in particular, to a voice interaction method and an electronic device.

BACKGROUND

Most of existing intelligent devices can receive voice information (for example, a voice command) sent by a user and perform an operation corresponding to the voice information. For example, the intelligent device may be a device such as a mobile phone, an intelligent robot, a smart watch, or a smart household device (for example, a smart TV). For example, the mobile phone may receive a voice command "turn down the volume" sent by the user and then automatically turn down the volume of the mobile phone.

Some intelligent devices may further provide a voice interaction function. For example, an intelligent robot may receive voice information from a user and have a voice conversation with the user based on the voice information, thereby implementing a voice interaction function. However, when having a voice conversation with a user, an existing intelligent device can provide only some patterned voice replies based on a set voice mode, resulting in poor performance of interaction between the intelligent device and the user and failing to provide the user with individualized voice interaction experience.

SUMMARY

This application provides a voice interaction method and an electronic device, to improve performance of the electronic device in interaction with a user, thereby providing the user with individualized voice interaction experience.

To achieve the foregoing technical objective, this application uses the following technical solutions.

According to a first aspect, this application provides a voice interaction method. The method may include: An electronic device may receive first voice information sent by a second user, and the electronic device recognizes the first voice information in response to receiving the first voice information. The first voice information is used to request a voice conversation with a first user. The electronic device may have, on a basis that the electronic device recognizes that the first voice information is voice information of the second user, a voice conversation with the second user by imitating a voice of the first user and in a mode in which the first user has a voice conversation with the second user.

In the foregoing solution, the electronic device may receive the first voice information and recognize that the first voice information is sent by the second user. The first voice information is to request a voice conversation with the first user. Therefore, the electronic device may recognize that the first voice information is used to indicate that the second user wants to have a voice conversation with the first user. In this way, the electronic device may intelligently have a voice conversation with the second user by imitating the voice of the first user and in the conversation mode in which the first user has a voice conversation with the second user. In this way, the electronic device can imitate the first user to provide the second user with communication experience of having a real-like voice conversation with the first user. Such a voice interaction manner improves interaction performance of the electronic device and can provide a user with individualized voice interaction experience.

In a possible implementation, the conversation mode is used to indicate a tone and phrasing of the first user in the voice conversation with the second user.

The electronic device has the voice conversation with the second user based on the conversation mode in which the first user has a voice conversation with the second user. In other words, the electronic device has the voice conversation with the first user based on the tone and the phrasing of the first user in a conversation with the second user. This provides the second user with communication experience of a more real-like voice conversation with the first user, thereby improving interaction performance of the electronic device.

In another possible implementation, the electronic device may store image information of the first user. Then, when the electronic device has the voice conversation with the second user by imitating the voice of the first user and in the mode in which the first user has a conversation with the second user, the electronic device may further display the image information of the first user.

If the electronic device can display an image and the electronic device stores the image information of the first user, when having the voice conversation with the second user by imitating the first user, the electronic device displays the image information of the first user. In this way, when the electronic device has the voice conversation with the second user by imitating the first user, the second user not only can hear the voice of the first user, and also can see an image of the first user. By using this solution, the user can be provided with communication experience similar to that in a face-to-face voice conversation with the first user.

In another possible implementation, the electronic device may store a facial model of the first user. Then, when the electronic device has the voice conversation with the second user by imitating the voice of the first user and in the mode in which the first user has a conversation with the second user, the electronic device may display the facial model of the first user by imitating an expression of the first user in the voice conversation with the second user. In the facial model displayed by the electronic device, the expression of the first user may change dynamically.

If the electronic device stores the facial model of the first user, when the electronic device has a voice interaction with the second user by imitating the first user, the electronic device displays the facial model of the first user. In addition, the facial model displayed by the electronic device may change dynamically, making the user think that he/she is having a voice conversation with the first user. In this way, when the electronic device has the voice conversation with the second user by imitating the first user, the second user not only can hear the voice of the first user, but also can see a facial expression of the first user as in a voice conversation with the first user. By using this solution, the user can be provided with experience of a more real-like face-to-face voice conversation with the first user.

In another possible implementation, before the electronic device receives the first voice information, the method may further include: The electronic device may further obtain second voice information. The second voice information is voice information of the first user in the voice conversation with the second user. The electronic device analyzes the obtained second voice information to obtain a voice feature of the first user in the voice conversation with the second user, and stores the voice feature.

It can be understood that the voice feature may include a voiceprint feature, a tone feature, and a phrasing feature. The tone feature is used to indicate the tone of the first user in the voice conversation with the second user, and the phrasing feature is used to indicate a commonly used phrase of the first user in the voice conversation with the second user. This provides the second user with communication experience of a more real-like voice conversation with the first user, thereby further improving interaction performance of the electronic device.

Before the electronic device has a voice interaction with the second user by imitating the first user, the electronic device obtains the second voice information. The second voice information is voice information of the first user in the voice conversation with the second user. The electronic device may analyze, based on the second voice information, the voice feature of the first user in the voice conversation with the second user. In this way, when the electronic device imitates the conversation mode in which the first user has a voice conversation with the second user, the electronic device may send a voice conversation similar to that of the first user, thereby providing the user with individualized voice interaction experience.

In another possible implementation, the electronic device may further store, in the second voice information, a record of a voice conversation that the electronic device has with the second user by imitating the first user.

In another possible implementation, that the electronic device may have, on a basis that the electronic device recognizes that the first voice information is voice information of the second user, a voice conversation with the second user by imitating a voice of the first user and in a conversation mode in which the first user has a voice conversation with the second user may be as follows: The electronic device recognizes that the first voice is voice information of the second user, and the electronic device sends voice response information of the first voice by imitating the voice of the first user and in the conversation mode in which the first user has a voice conversation with the second user. If the electronic device receives third voice information after sending the voice response information of the first voice, and the electronic device recognizes that the third voice is voice information of the second user, the electronic device recognizes that the third voice is voice information of the second user, and the electronic device may send voice response information of the third voice information by imitating the voice of the first user and in the conversation mode in which the first user has a voice conversation with the second user.

It can be understood that when the electronic device responds to the first voice information by imitating the mode in which the first user has a conversation with the second user, after receiving the third voice information, the electronic device needs to recognize that the third voice is sent by the second user. Then, after recognizing that the third voice information is voice information of the second user, the electronic device needs to send the response information in response to the third voice information. If there is another user sending voice information in an environment in which the electronic device has the voice conversation with the second user, after receiving the third voice information, the electronic device recognizes that the third voice information is sent by the second user, thereby having a better voice conversation with the second user. This improves a voice interaction function and improves user experience.

In another possible implementation, the electronic device may obtain schedule information of the first user. The schedule information is used to indicate a schedule of the first user. That the electronic device sends voice response information of the third voice may be as follows: The electronic device sends the voice response information of the third voice information with reference to the schedule information.

If the third voice is information sent by the second user for querying the schedule of the first user, because the electronic device has obtained the schedule information of the first user, the electronic device may directly respond to the third voice information based on the schedule information, thereby providing the first user with individualized interaction experience.

In another possible implementation, the electronic device may store the record of the voice conversation that the electronic device has with the second user by imitating the voice of the first user, and the electronic device may further send the record of the voice conversation to an electronic device of the first user.

The electronic device sends the record of the voice conversation to the electronic device of the first user, so that the first user can know content of the conversation. In this way, the electronic device provides more individualized voice interaction for the second user.

In another possible implementation, the electronic device stores the record of the voice conversation that the electronic device has with the second user by imitating the first user, and the electronic device may further extract a keyword in the voice conversation from the record of the voice conversation. The electronic device may send the keyword to the electronic device of the first user.

In another possible implementation, the electronic device has a voice interaction with the second user by imitating the voice of the first user and in the conversation mode in which the first user has a voice conversation with the second user. The electronic device may further obtain image information and action information of the second user, and store the image information and the action information of the second user.

When having the voice conversation with the second user by imitating the first user, the electronic device obtains the image information and the action information of the second user, and may learn an expression and an action of the second user in a voice conversation with the first user, so that the electronic device imitates a mode in which the second user has a voice conversation with the first user.

According to a second aspect, this application further provides an electronic device. The electronic device may include a memory, a voice module, and one or more processors. The memory and the voice module are coupled to the one or more processors.

The microphone may be configured to receive first voice information. The memory is configured to store computer program code, where the computer program code includes computer instructions. When the processor executes the computer instructions, the processor is configured to: recognize the first voice information in response to the first voice information, where the first voice information is used to request a voice conversation with a first user; and have, on a basis that it is recognized that the first voice is voice information of a second user, a voice conversation with the second user by imitating a voice of the first user and in a conversation mode in which the first user has a voice conversation with the second user.

In a possible implementation, the electronic device may further include a display. The display is coupled to the processor. The display is configured to display image information of the first user.

In another possible implementation, the electronic device stores a facial model of the first user. The display of the electronic device is further configured to display the facial model by imitating an expression of the first user in the voice conversation with the second user. In the facial model, the expression of the first user changes dynamically.

In another possible implementation, the microphone is further configured to obtain second voice information. The second voice information is voice information of the first user in the voice conversation with the second user.

The processor is further configured to analyze the second voice information to obtain a voice feature of the first user in the voice conversation with the second user, and store the voice feature.

The voice feature includes a voiceprint feature, a tone feature, and a phrasing feature. The tone feature is used to indicate a tone of the first user in the voice conversation with the second user, and the phrasing feature is used to indicate a commonly used phrase of the first user in the voice conversation with the second user.

In another possible implementation, the processor is further configured to store, in the second voice information, a record of a voice conversation that the electronic device has with the second user by imitating the first user.

In another possible implementation, the microphone is further configured to receive third voice information. The processor is further configured to: recognize the third voice information in response to the third voice information. A speaker is further configured to send, on a basis that it is recognized that the third voice information is the voice information of the second user, voice response information of the third voice information by imitating the voice of the first user and in the conversation mode in which the first user has a voice conversation with the second user.

In another possible implementation, the processor is further configured to obtain schedule information of the first user. The schedule information is used to indicate a schedule of the first user. The sending voice response information of the third voice information includes: sending, by the electronic device, the voice response information of the third voice information with reference to the schedule information.

In another possible implementation, the processor is further configured to store the record of the voice conversation that the electronic device has with the second user by imitating the voice of the first user, and send the record of the voice conversation to an electronic device of the first user.

In another possible implementation, the processor is further configured to store the record of the voice conversation that the electronic device has with the second user by imitating the first user; extract, from the record of the voice conversation, a keyword in the voice conversation that the electronic device has with the second user by imitating the first user; and send the keyword to the electronic device of the first user.

In another possible implementation, the electronic device further includes a camera. The camera is coupled to the processor. The camera is configured to obtain image information and action information of the second user, and the processor is further configured to store the image information and the action information of the second user.

According to a third aspect, this application further provides a server. The server may include a memory and one or more processors. The memory is coupled to the one or more processors. The memory is configured to store computer program code, and the computer program code includes computer instructions. When the processor executes the computer instructions, the server is enabled to perform the method according to any one of the first aspect or the possible implementations of the first aspect.

According to a fourth aspect, this application further provides a computer readable storage medium, including computer instructions. When the computer instructions are run on an electronic device, the electronic device is enabled to perform the method according to any one of the first aspect or the possible implementations of the first aspect.

According to a fifth aspect, this application provides a computer program product. When the computer program product runs on a computer, the computer is enabled to perform the method according to any one of the first aspect or the possible implementations of the first aspect.

It can be understood that, for beneficial effects that the electronic device according to the second aspect, the server according to the third aspect, the computer readable storage medium according to the fourth aspect, and the computer program product provided in this application can achieve, reference may be made to the beneficial effect in any one of the first aspect or the possible design manners of the first aspect.

DESCRIPTION OF EMBODIMENTS

Figure 1A:
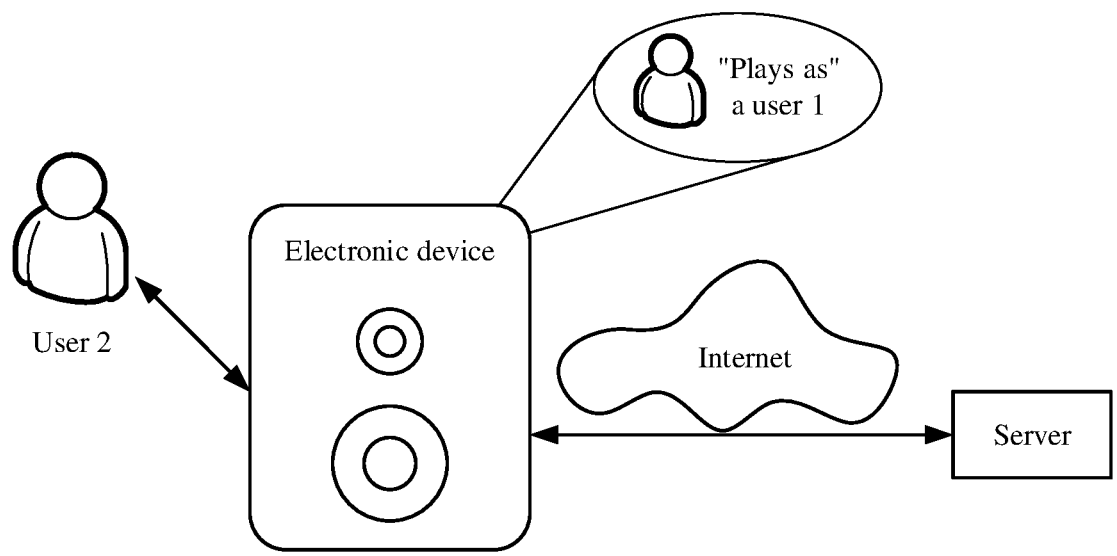
FIG. 1A is a diagram of an architecture of a system according to an embodiment of this application.

The following terms "first" and "second" are merely intended for a purpose of description, and shall not be understood as an indication or implication of relative importance or implicit indication of the quantity of indicated technical features. Therefore, a feature limited by "first" or "second" may explicitly or implicitly include one or more features. In the descriptions of the embodiments, unless otherwise specified, "a plurality of" means two or more than two.

A general electronic device that has a voice interaction function can send a corresponding voice response based on recognized voice information. However, the electronic device cannot recognize a user that sends the voice information. In other words, when performing a voice interaction function, the electronic device sends a corresponding voice response once the electronic device recognizes voice information. In addition, the corresponding voice response sent by the electronic device is also fixed. The voice interaction function of the electronic device enables the electronic device to have a voice conversation with a user. If the electronic device can recognize a user that sends voice information, the electronic device may send a corresponding voice response specifically based on the user that sends the voice information, to provide the user with individualized voice interaction experience, thereby improving interest of the user in having a voice interaction with the electronic device.

In addition, the electronic device generally cannot "play as" another user. Herein, "playing as" means that in a voice interaction with a user 2, the electronic device has the voice interaction with the user 2 by imitating a voice of a user 1 and in a mode in which the user 1 has a conversation with the user 2. In some actual cases, for example, parents need to go to work and cannot communicate with their child at that time. If an electronic device can "play as" the father or the mother to have a voice conversation with the child, to meet the child's desire for communicating with the parents, the electronic device can provide the child with more individualized and humanized voice interaction.

Embodiments of this application provide a voice interaction method, which is applied to an electronic device, to enable the electronic device to "play as" a user 1 to have a voice interaction with a user 2. This improves voice interaction performance of the electronic device, and may further provide the user 2 with individualized interaction experience.

For example, in the embodiments of this application, the electronic device may be a mobile phone, a TV, a smart speaker, a tablet computer, a desktop computer, a laptop computer, a handheld computer, a notebook computer, an in-vehicle device, an ultra-mobile personal computer (UMPC), a netbook, a cellular phone, a personal digital assistant (PDA), an augmented reality (AR)/virtual reality (VR) device, or the like. In the embodiments of this application, a specific form of the electronic device is not particularly limited.

The following describes the technical solutions of the embodiments in this application with reference to accompanying drawings.

FIG. 1A is a diagram of an architecture of a system according to an embodiment of this application. It is assumed that an electronic device "plays as" a user 1 to have a voice interaction with a user 2. As shown in FIG. 1A, the electronic device may collect voice information sent by the user 2. The electronic device may interact with a remote server through the Internet, to send the voice information of the user 2 to the server. The server generates response information corresponding to the voice information, and sends the generated response information corresponding to the voice information to the electronic device. The electronic device is configured to play the response information corresponding to the voice information, to implement a voice interaction with the user 2 by "playing as" the user 1. In other words, the electronic device may collect and recognize the voice information sent by the user 2, and may play the response information corresponding to the voice information. In this implementation, the server connected to the electronic device recognizes the voice information of the user 2 and generates the response information corresponding to the voice information. The electronic device plays the response information corresponding to the voice information. This can reduce a computation requirement on the electronic device, thereby reducing production costs of the electronic device.

Figure 1B:
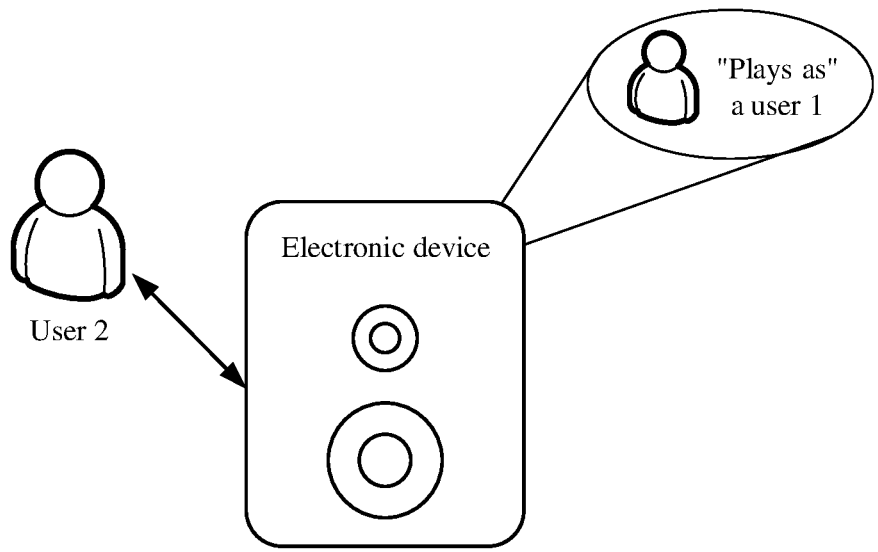
FIG. 1B is a diagram of an architecture of another system according to an embodiment of this application.

FIG. 1B is a diagram of an architecture of another system according to an embodiment of this application. It is assumed that an electronic device "plays as" a user 1 to have a voice interaction with a user 2. As shown in FIG. 1B, the electronic device may collect voice information sent by the user 2. The electronic device recognizes, based on the voice information, that the voice information is voice information of the user 2. The voice information is to request a voice conversation with the user 1. The electronic device generates corresponding response information based on the voice information and plays the response information. In this implementation, the electronic device can implement voice interaction, thereby reducing dependency of the electronic device on the Internet.

Figure 2A:
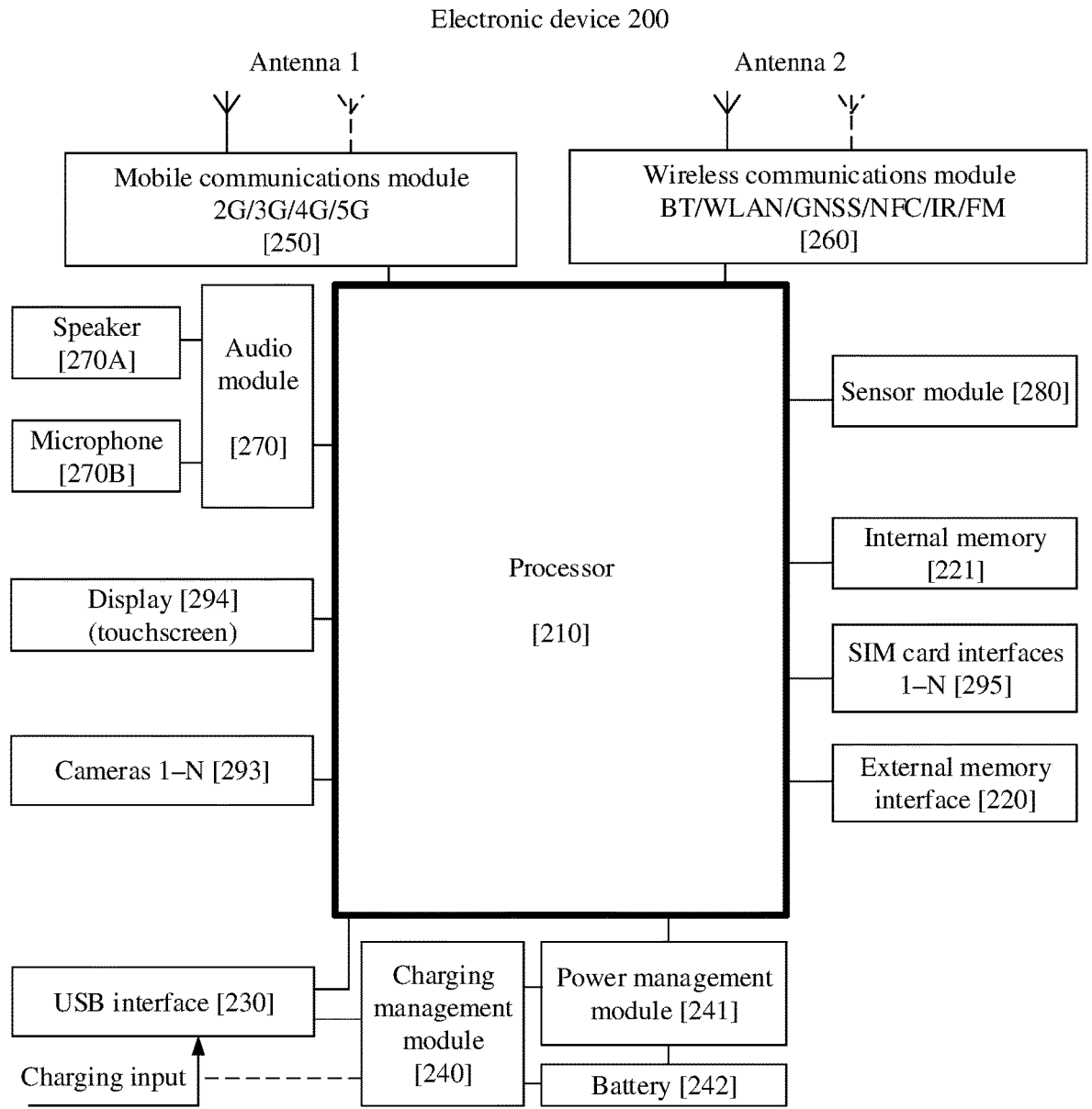
FIG. 2A is a schematic diagram of a structure of an electronic device according to an embodiment of this application.

FIG. 2A is a schematic diagram of a structure of an electronic device 200 according to an embodiment of this application. As shown in FIG. 2A, the electronic device 200 may include a processor 210, an external memory interface 220, an internal memory 221, a universal serial bus (USB) interface 230, a charging management module 240, a power management module 241, a battery 242, an antenna 1, an antenna 2, a mobile communications module 250, a wireless communications module 260, an audio module 270, a sensor module 280, a camera 293, a display 294, and the like.

It may be understood that the structure shown in embodiments of the present invention does not constitute a specific limitation on the electronic device 200. In some other embodiments of this application, the electronic device 200 may include more or fewer components than those shown in the figure, or some components may be combined, or some components may be split, or there may be a different component layout. The components shown in the figure may be implemented by using hardware, software, or a combination of software and hardware.

The processor 210 may include one or more processing units. For example, the processor 210 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent devices, or may be integrated into one or more processors.

The controller may be a nerve center and a command center of the electronic device 200. The controller may generate an operation control signal based on instruction operation code and a timing signal, to complete control of instruction reading and instruction execution.

A memory may be further disposed in the processor 210, and is configured to store instructions and data. In some embodiments, the memory in the processor 210 is a cache. The memory may store instructions or data that has just been used or recycled by the processor 210. If the processor 210 needs to use the instruction or the data again, the processor 210 may directly invoke the instruction or the data from the memory. This avoids repeated access and reduces a waiting time of the processor 210, thereby improving system efficiency.

In some embodiments, the processor 210 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

It may be understood that an interface connection relationship between the modules that is shown in this embodiment of the present invention is merely an example for description, and does not constitute a limitation on the structure of the electronic device 200. In some other embodiments of this application, the electronic device 200 may alternatively use an interface connection manner different from that in the foregoing embodiment, or a combination of a plurality of interface connection manners.

The external memory interface 220 may be configured to connect to an external memory card, for example, a micro SD card, to extend a storage capability of the electronic device 200. The external memory card communicates with the processor 210 by using the external memory interface 220, to implement a data storage function. For example, files such as music and a video are stored in the external memory card.

The internal memory 221 may be configured to store computer-executable program code, where the executable program code includes instructions. The processor 210 runs the instructions stored in the internal memory 221, to perform various function applications and data processing of the electronic device 200. The internal memory 221 may include a program storage area and a data storage area. The program storage area may store an operating system, an application required by at least one function (for example, a voice playing function or an image playing function), and the like. The data storage area may store data (such as audio data and a phone book) created when the electronic device 200 is used, and the like. In addition, the internal memory 221 may include a high-speed random access memory, and may further include a nonvolatile memory, for example, at least one magnetic disk storage device, a flash memory device, or a universal flash storage (UFS).

The charging management module 240 is configured to receive a charging input from a charger. The charger may be a wireless charger or a wired charger. The power management module 241 is configured to connect to the battery 242, the charging management module 240, and the processor 210. The power management module 241 receives an input from the battery 242 and/or the charging management module 240, to supply power to the processor 210, the internal memory 221, an external memory, the display 294, the wireless communications module 260, the audio module 270, and the like.

A wireless communication function of the electronic device 200 may be implemented through the antenna 1, the antenna 2, the mobile communications module 250, the wireless communications module 260, the modem processor, the baseband processor, and the like.

The mobile communications module 250 can provide a solution, applied to the electronic device 200, to wireless communication including 2G, 3G, 4G, 5G, or the like. The mobile communications module 250 may include at least one filter, a switch, a power amplifier, a low noise amplifier (LNA), and the like. The mobile communications module 250 may receive an electromagnetic wave by using the antenna 1, perform processing such as filtering and amplification on the received electromagnetic wave, and transmit the electromagnetic wave to the modem processor for demodulation. The mobile communications module 250 may further amplify a signal modulated by the modem processor, and convert the signal into an electromagnetic wave by using the antenna 1 for radiation.

The wireless communications module 260 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the electronic device 200. The wireless communications module 260 may be one or more devices integrating at least one communication processing module. The wireless communications module 260 receives an electromagnetic wave by using the antenna 2, performs frequency modulation and filtering on the electromagnetic wave signal, and sends the processed signal to the processor 210. The wireless communications module 260 may further receive a to-be-sent signal from the processor 210, perform frequency modulation and amplification on the to-be-sent signal, and convert the signal into an electromagnetic wave by using the antenna 2 for radiation.

The display 294 is configured to display an image, a video, and the like. The display 294 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 200 may include one or N displays 294, where N is a positive integer greater than 1.

The camera 293 is configured to capture a still image or a video. An optical image of an object is generated by using the lens, and is projected onto a photosensitive element. The photosensitive element may be a charge coupled device (CCD) or a complementary metal-oxide-semiconductor (CMOS) photoelectric transistor. The photosensitive element converts the optical signal into an electrical signal, and then transfers the electrical signal to the ISP for conversion into a digital image signal. The ISP outputs the digital image signal to the DSP for processing. The DSP converts the digital image signal into an image signal in a standard format such as RGB or YUV. In some embodiments, the electronic device 200 may include one or N cameras 293, where N is a positive integer greater than 1.

The digital signal processor is configured to process a digital signal, and may process another digital signal in addition to the digital image signal. For example, when the electronic device 200 selects a frequency, the digital signal processor is configured to perform Fourier transformation on frequency energy.

The video codec is configured to compress or decompress a digital video. The electronic device 200 may support one or more video codecs. In this way, the electronic device 200 can play or record videos in a plurality of coding formats, for example, moving picture experts group (MPEG)-1, MPEG-2, MPEG-3, and MPEG-4.

The electronic device 200 may implement an audio function, for example, music playing or recording, by using the audio module 270, a speaker 270A, a microphone 270B, the application processor, and the like.

The audio module 270 is configured to convert digital audio information into an analog audio signal for output, and is also configured to convert analog audio input into a digital audio signal. The audio module 270 may be further configured to: code and decode an audio signal. In some embodiments, the audio module 270 may be disposed in the processor 210, or some function modules in the audio module 270 are disposed in the processor 210.

The speaker 270A, also referred to as a "horn", is configured to convert an audio electrical signal into a sound signal. The electronic device 200 may listen to music or answer a hands-free call by using the speaker 270A. In some embodiments, the speaker 270A may play response information of voice information.

The microphone 270B, also referred to as a "mike" or a "mic", is configured to convert a sound signal into an electrical signal. When making a call or sending voice information, a user may make a sound by moving a human mouth close to the microphone 270B to input a sound signal to the microphone 270B. For example, the microphone 270B may collect the voice information sent by the user. At least one microphone 270B may be disposed in the electronic device 200. In some other embodiments, two microphones 270B may be disposed in the electronic device 200, to collect a sound signal and further implement a noise reduction function. In some other embodiments, three, four, or more microphones 270B may alternatively be disposed in the electronic device 200, to collect a sound signal, reduce noise, identify a sound source, implement a directional recording function, and the like.

A software system of the electronic device 200 may use a layered architecture, an event-driven architecture, a microkernel architecture, a micro service architecture, or a cloud architecture. In the embodiments of the present invention, an Android system with the layered architecture is used as an example to illustrate a software structure of the electronic device 200.

Figure 2B:
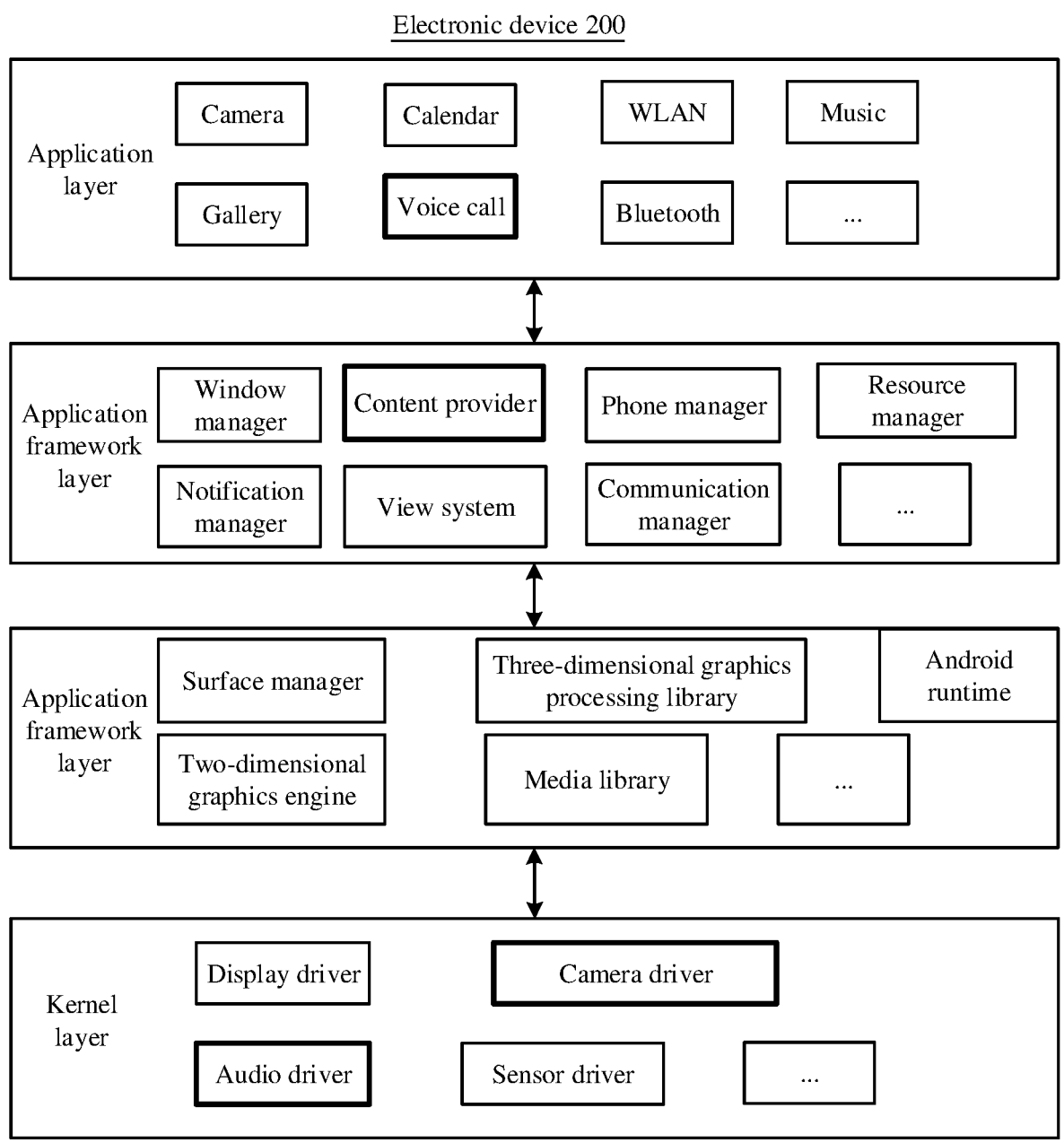
FIG. 2B is a schematic diagram of a software structure of an electronic device according to an embodiment of this application.

FIG. 2B is a block diagram of a software structure of an electronic device 200 according to an embodiment of the present invention.

In a layered architecture, software is divided into several layers, and each layer has a clear role and task. The layers communicate with each other through a software interface. In some embodiments, an Android system is divided into four layers: an application layer, an application framework layer, an Android runtime and system library, and a kernel layer from top to bottom.

The application layer may include a series of application packages.

As shown in FIG. 2B, the application packages may include applications such as camera, gallery, calendar, WLAN, voice call, Bluetooth, music, and video.

The application framework layer provides an application programming interface (API) and a programming framework for an application at the application layer. The application framework layer includes some predefined functions.

As shown in FIG. 2B, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history and bookmarks, a phone book, and the like. For example, the data may be a voiceprint feature of a user 2 or a relationship between the user 2 and a user 1.

The view system includes visual controls, such as a control for displaying a text and a control for displaying an image. The view system may be configured to construct an application. A display interface may include one or more views.

The phone manager is configured to provide a communication function of the electronic device 200, for example, management of a call status (including answering or declining).

The resource manager provides various resources for an application, such as a localized character string, an icon, a picture, a layout file, and a video file.

The notification manager enables an application to display notification information in a status bar, and may be configured to convey a notification type message, where the displayed notification information may automatically disappear after a short pause and require no user interaction. For example, the notification manager is configured to notify that downloading is completed, provide a message reminder, or remind that Bluetooth pairing succeeded. The notification manager may alternatively be a notification that appears in a top status bar of the system in a form of a graph or a scroll bar text, for example, a notification of an application running on the background or a notification that appears on the screen in a form of a dialog window. For example, text information is displayed in the status bar, an alert sound is played, the electronic device vibrates, or the indicator light blinks.

The Android runtime includes a kernel library and a virtual machine. The Android runtime is responsible for scheduling and management of the Android system.

The kernel library includes two parts: a function that needs to be invoked in java language and a kernel library of Android.

The application layer and the application framework layer run on the virtual machine. The virtual machine executes java files at the application layer and the application framework layer as binary files. The virtual machine is configured to implement functions such as object lifecycle management, stack management, thread management, security and exception management, and garbage collection.

The system library may include a plurality of function modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording of audio and video in a plurality of commonly used formats, static image files, and the like. The media library may support a plurality of audio and video encoding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

All methods in the following embodiments may be implemented in the electronic device having the foregoing hardware structure.

Figure 3A:
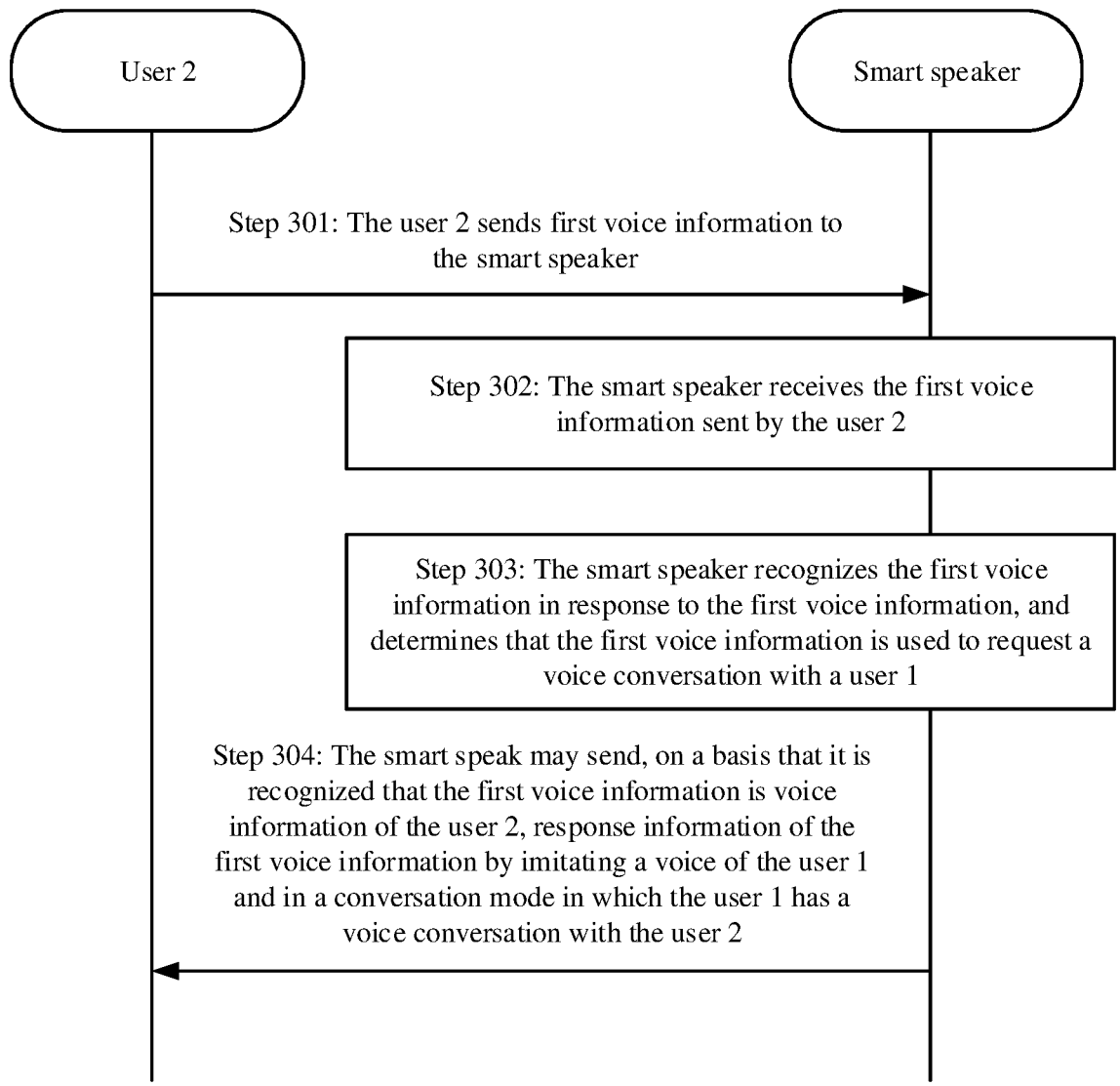
FIG. 3A is a flowchart of a voice interaction manner according to an embodiment of this application.

FIG. 3A is a flowchart of a voice interaction method according to an embodiment of this application. In a specific example for describing the voice interaction method in this embodiment of this application, an electronic device is a smart speaker, and the smart speaker "plays as" a user 1 to have a voice conversation with a user 2. As shown in FIG. 3A, the method includes step 301 to step 304.

Step 301: The user 2 sends first voice information to the smart speaker.

The first voice information is used to request the smart speaker to "play as" the user 1 to have a voice conversation with him/her (the user 2).

In a possible scenario, when parents of a family have gone to work, and a child at home needs accompanying by the parents and wants to have a voice conversation with the parents, the child can send voice information to a smart speaker at home, to request the smart speaker to "play as" the father or the mother to accompany him/her. For example, the first voice information may be "I want to talk to dad" or "speaker, speaker, I want to talk to dad".

It can be understood that the smart speaker can work only after the smart speaker is woken up, and that a wakeup voice of the smart speaker may be fixed. In some embodiments, before step 301, the user 2 may first send a wakeup word to the smart speaker, to make the smart speaker be in an active state.

In an implementation 1, the wakeup word may be "speaker, speaker", "smart speaker", "voice speaker", or the like. The wakeup word may be preconfigured in the smart speaker, or may be set in the smart speaker by a user. In this embodiment, the first voice information may not include the wakeup word. For example, the first voice information may be "I want to talk to dad".

In an implementation 2, the first voice information may include the wakeup word, and may further include a voice command sent by the user 2 to the smart speaker. For example, the first voice information may be "speaker, speaker, I want to talk to dad".

Step 302: The smart speaker receives the first voice information sent by the user 2.

When the smart speaker is not woken up, the smart speaker is in a sleep state. When wanting to use the smart speaker, the user 2 may wake up a voice assistant by voice. A voice wake-up process may include: The smart speaker monitors voice data by using a low-power digital signal processor (DSP). When the DSP detects that a similarity between the voice data and the wake-up word meets a specific condition, the DSP delivers the detected voice data to an application processor (AP). The AP detects text of the voice data, to determine whether the voice data can wake up the smart speaker.

It can be understood that when the smart speaker is in the sleep state, the smart speaker may listen to, at any time, voice information sent by a user. If the voice information is not wakeup voice for waking up the smart speaker to work, the smart speaker does not respond to the voice information, and does not record the voice information either.

In the implementation 1, the smart speaker is in the active state. Therefore, the first voice information may not include the wakeup word of the smart speaker. The smart speaker receives the first voice information and responds to the first voice information.

In the implementation 2, the smart speaker is in the sleep state. Therefore, the first voice information includes the wakeup word of the smart speaker. The smart speaker is woken up after receiving the first voice information and responds to the first voice information.

Step 303: The smart speaker recognizes the first voice information in response to receiving the first voice information at step 302, and determines that the first voice information is used to request a voice conversation with the user 1.

The smart speaker may recognize text of the first voice information; and determine, based on a result of the text recognition, that the first voice information is used to request a voice conversation with the user 1. To be specific, the first voice information includes a name or an addressing name of a role that the smart speaker needs to "play", so that the smart device can recognize, based on the name or the addressing name, the role to "play". When recognizing the name in the first voice information, the smart speaker may determine the role to "play". For example, the first voice information is "I want to talk to Li Ming". The smart speaker may determine that a role to "play" is Li Ming. When recognizing the addressing name in the first voice information, the smart speaker may determine that it is the user 2 that sends the first voice information. The smart speaker determines, based on a relationship between the user 2 and the addressing name in the first voice information, the role to "play".

For example, a use scenario of the smart speaker is a home environment. A relationship between family members may be pre-stored in the smart speaker. After receiving the first voice information, the smart speaker may determine, based on the relationship between the family members, the role that the smart speaker needs to "play".

Example 1: The first voice information sent by the user 2 and received by the smart speaker is "I want to talk to dad". After recognizing the first voice information, the smart speaker recognizes the addressing name "dad" and can determine that the user 2 and the role to play are in a father-son relationship. The smart speaker can recognize that the first voice information is sent by a child "Li Xiaoming"; and determine, based on a father-son relationship between Li Ming and Li Xiaoming in the pre-stored relationship between the family members, that the role to "play" is Li Ming (the father).

Example 2: The first voice information sent by the user 2 and received by the smart speaker is "I want to talk to Li Ming". The smart speaker recognizes that a name included in the first voice information is "Li Ming". The smart speaker can further recognize that the first voice information is sent by "Li Xiaoming". The smart speaker determines, based on the pre-stored relationship between the family members, that Li Ming and Li Xiaoming are in a father-son relationship. The smart speaker determines that a role to play is Li Xiaoming's "father" (Li Ming).

For example, the smart speaker is applied to a home scenario. During initial setting of the smart speaker, a relationship between family members needs to be recorded in the smart speaker. In a possible implementation, provided that the smart speaker obtains a relationship between a family member and another family member, the smart speaker can deduce a relationship between the family member and other family members. For example, the family members include a grandfather, a grandmother, a father, a mother, and a child. If information about the grandfather, the grandmother, and the mother is already entered, after information about the father is entered, only indicating that the father and the mother are in a spousal relationship may be sufficient. The smart speaker can deduce, based on the relationship between the mother and the father, that the grandfather and the father are in a father-son relationship, and the grandmother and the father are in a mother-son relationship. The deduction may be implemented by using a technology, for example, a knowledge graph.

In some embodiments, pre-stored information about a family member may include the name, the age, the gender, a contact method, voice information, image information, a hobbit, a character, and the like. In addition, information about a relationship between the family member and an existing family member is recorded. When information about each family member is recorded, an addressing name of the member may be also recorded, for example, "father", "grandfather", "Grandpa Li", and "Mr. Li". Both "father" and "Mr. Li" refer to Li Ming, and both "grandfather" and "Mr. Li Senior" refer to Li Ming's father. For example, Li Xiaoming is the user 2, and the first voice information is "I want to talk to Mr. Li" or the first voice information is "I want to talk to dad". The smart speaker may determine that a role to play is the father Li Ming.

Step 304: The smart speaker may send, on a basis that it is recognized that the first voice information is voice information of the user 2, response information of the first voice information by imitating a voice of the user 1 and in a conversation mode in which the user 1 has a voice conversation with the user 2.

It can be understood that the smart speaker recognizes that the first voice is voice information sent by the user 2, and the smart speaker may generate the response information of the first voice information based on the conversation mode in which the user 1 has a conversation with the user 2. In other words, the smart speaker may "play as" the user 1, and deduce information that the user 1 may respond with after hearing the first voice information sent by the user 2.

The smart speaker pre-stores the voice of the user 1 and the mode in which the user 1 has a conversation with the user 2. The smart speaker sends voice information by imitating the voice of the user 1 and in the mode in which the user 1 has a conversation with the user 2, to make the user 2 believe that he/she is actually having a voice conversation with the user 1, thereby providing the user 2 with individualized voice interaction experience.

On the one hand, the smart speaker may analyze the voice of the user 1, including analyzing a voiceprint feature of the user 1. A voiceprint feature of each person is unique. Therefore, a person whose speaks may be identified based on a voiceprint feature in voice. The smart speaker analyzes the voice of the user 1 and stores the voiceprint feature of the user 1, so that the smart speaker can imitate the voice of the user 1 when "playing as" the user 1.

Specifically, when receiving voice information of the user 1, the smart speaker can obtain the voiceprint feature of the user 1 through analysis. The smart speaker stores the voiceprint feature of the user 1. In this way, when determining that the smart speaker needs to "play as" the user 1, the smart speaker may imitate the voice of the user 1 based on the stored voiceprint feature of the user 1. It can be understood that when having a voice conversation with the user 1, the smart speaker may update the voiceprint feature of the user 1 based on a change of the voice of the user 1. Alternatively, as time changes, the smart speaker may update, after an interval of a preset time, the voiceprint feature of the user 1 in a voice conversation with the user 1.

On the other hand, the mode in which the user 1 has a conversation with the user 2 may reflect a language expression characteristic of the user 1. The mode in which the user 1 has a conversation with the user 2 includes a tone and phrasing the user 1 uses in a voice conversation with the user 2. A person may take different tones when having voice conversations with different persons. For example, one takes a gentle tone when communicating with his/her beloved, and takes a respectful tone when communicating with an elderly in the family. Therefore, the smart speaker may deduce, based on a relationship between a role to "play" and the user 2, a tone of the user 1 to play as. The phrasing of the user 1 in a voice conversation with the user 2 may also reflect a language expression characteristic of the user 1. In this way, the response information that is of the first voice information and that is generated by the smart speaker based on the phrasing of the user 1 in a voice conversation with the user 2 is closer to a language expression of the user 1. The smart speaker may send the response information of the first voice information by imitating the voice of the user 1 and in the mode in which the user 1 has a conversation with the user 2, making the user 2 thinks he/she is having a voice conversation with the user 1.

Specifically, the conversation mode in which the user 1 has a voice conversation with the user 2 may include a tone, a phrasing habit (for example, a pet phrase), a language expression habit, and the like of the user 1 in a conversation with the user 2. The tone of the user 1 in a conversation with the user 2 includes solemn, gentle, harsh, leisurely, aggressive, and the like. A phrasing habit is a language expression characteristic of a person when he/she speaker, for example, phrases such as "then", "exactly", "yes", and "have you got it" habitually used when he/she speaks. A language expression characteristic can reflect a language expression characteristic of a person. For example, someone likes to say inverted sentences when he/she talks, for example, "dinner, have you had it?" or "then first will I leave".

For example, a voice conversation between the user 1 and the user 2 may be pre-stored in the smart speaker. The smart speaker can learn the voice conversation, to learn of information such as the tone, the phrasing habit, and the language expression characteristic of the user 1 in the voice conversation with the user 2 and store the learned information in dialog information of the person. The conversation information may store information about a conversation that the person has with another person. If the smart speaker receives a request of the user 2 for requesting the smart speaker to "play as" the user 1 to have a conversation, the smart speaker may send a voice conversation based on the stored mode in which the user 1 has a conversation with the user 2.

It can be understood that if the smart speaker obtains more voice conversations between the user 1 and the user 2, information that is about the mode in which the user 1 has a conversation with the user 2 and that is learned of and summarized by the smart speaker is more accurate. When the smart speaker "plays as" the user 1, the response information that is of the first voice information and that is sent by the smart speaker is closer to a voice reply that the user 1 may give. Similarly, the smart speaker can also learn, from a voice conversation between the user 1 and the user 2, of a conversation mode in which the user 2 has a conversation with the user 1; and store, in conversation information of the user 2, the conversation mode of the user 2 as information of the user 2.

For another example, if the smart speaker has never stored a voice conversation between the user 1 and the user 2, the smart speaker may deduce, based on a relationship between the user 1 and the user 2, a tone that the user 1 may use. For example, the smart speaker recognizes that the relationship between the user 1 and the user 2 is father and son, and the smart speaker needs to "play" the role of the father. The smart speaker may consider by default that the tone of the user 1 is harsh.

The smart speaker deduces, based on the relationship between the user 1 and the user 2, a tone of the user 1 when the user 1 sends a voice response. The smart speaker may deduce at least one tone of the user 1. For example, the smart speaker determines that the relationship between the user 1 and the user 2 is grandfather and grandson. Tones of the user 1 deduced by the smart speaker are doting, leisurely, and happy.

Figure 3B:
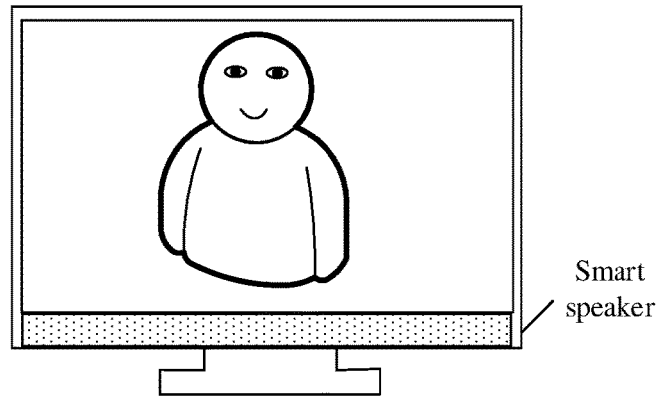
FIG. 3B is a schematic diagram of a display interface of a smart speaker according to an embodiment of this application.

In some embodiments, the smart speaker has a display. Then, when "playing as" the user 1 to have a voice conversation with the user 2, the smart speaker may display a photo of the user 1 on the display. As shown in FIG. 3B, a display on a smart speaker in FIG. 3B shows a photo of the user 1. Alternatively, the smart speaker stores a facial model of the user 1. Then, when the smart speaker "plays as" the user 1 to have a voice conversation with the user 2, dynamic expression changes of the user 1 may be displayed on the display.

In addition, when the smart speaker "plays as" the user 1 to have a voice interaction with the user 2, the smart speaker may also start a camera to obtain image information of the user 2. The smart speaker recognizes the obtained image information of the user 2, that is, obtains information such as an appearance and an action of the user 2. In this way, the smart speaker can build a figure model of the user 2 by using the voice information of the user 2 and the image information of the user 2. The smart speaker builds the figure model of the user 2, so that the smart speaker can conveniently "play as" the user 2 more vividly and lively in the future.

For example, when the smart speaker "plays as" the user 1 to have a voice interaction with the user 2, the smart speaker may also start the camera to obtain an expression, an action, or the like of the user 2. This is convenient for the smart speaker to build the figure model of the user 2 by using the voice information of the user 2 and the image information of the user 2 and determine action information and expression information of the user 2 in a conversation with the user 1.

It is assumed that in a process of voice interaction between the user 2 and the smart speaker, the smart speaker receives voice information from the user 2 for querying a schedule of the user 1. The smart speaker may obtain schedule information of the user 1. The schedule information is used indicate the schedule of the user. In this way, the smart speaker can respond, based on the schedule information of the user 1, to the voice information for querying the schedule. For example, the smart speaker "plays as" Li Ming to have a voice conversation with the son Li Xiaoming, and the son Li Xiaoming sends voice information for querying a schedule of the father. It is assumed that the voice information is "will you come to my graduation ceremony on Friday". The smart speaker determines, by querying the schedule information of the user 1 (namely, the father), that in the schedule of the father, the father has a business trip on Friday. The smart speaker may reply "Son, just notified by the company that I need to take a business trip to Beijing to attend an important meeting. I may not be able to attend your graduation ceremony on Friday."

It is worth mentioning that the smart speaker may also store conversation information each time the smart speaker "plays" the role. When "playing" the role next time, if related schedule information is involved, the smart speaker may feed back an updated schedule to the user 2. For another example, after the smart speaker ends the voice conversation with Li Xiaoming in which the smart speaker "plays as" the father, the smart speaker "plays as" Xiaoming to have a voice conversation with Xiaoming's mother (the user 2). Voice information sent by Xiaoming's mother is "Son, I will attend your graduation ceremony on Friday with your dad". The smart speaker may reply, based on the voice conversation in which the smart speaker "plays as" the father, "My dad told me that he needs to take a business trip to Beijing to attend a meeting and cannot attend my graduation ceremony".

It should be noted that step 301 to step 304 are one conversation between the user 2 and the smart speaker. After step 304, the smart speaker may continue to have a voice conversation with the user 2. For example, the user 2 sends voice information to the smart speaker again. After the smart speaker receives the voice information, on a basis that the voice information is voice information sent by the user 2, the smart speaker continues to have a voice conversation with the user 2 by imitating the voice of the user 1 and in the mode in which the user 1 has a conversation with the user 2. In other words, the smart speaker sends voice information by imitating the voice of the user 1 and in the mode in which the user 1 has a conversation with the user 2 only when receiving voice information of the user 2 again. If the voice information is not sent by the user 2, the smart speaker may not imitate the voice of the user 1.

In some embodiments, each time after responding to voice information of the user 2, the smart speaker may wait for a preset time. The preset time waited for may be a response time of the user 2, so that the smart speaker can maintain the voice conversation with the user 2. If no voice information of the user 2 is received within the preset time, the smart speaker may end the current voice conversation.

For example, if the smart speaker determines that the voice conversation with the user 2 is ended, the smart speaker may send content of the current voice conversation to an electronic device of the user 1, so that the user 1 learns of details about the conversation that the smart speaker has with the user 2 by "playing as" him/her (the user 1). Alternatively, when the smart speaker determines that the voice conversation with the user 2 is ended, the smart speaker may summarize an abstract of the current voice conversation and send the abstract of the voice conversation to the electronic device of the user 1. In this way, the user 1 can briefly learn of details about the conversation that the smart speaker has with the user 2 by "playing as" him/her (the user 1).

In an embodiment, after receiving information indicating that the voice conversation is ended, the smart speaker may send the abstract of the voice conversation to the electronic device of the user 1 after a preset time. For example, the user 2 is Xiaoming's mother, and the user 1 that the smart speaker plays as is Xiaoming. If Xiaoming's mother is going for grocery shopping and says to the smart speaker "I am going for grocery shopping. Finish your homework before watching TV". Then, the user 2 is Xiaoming's grandmother, and the user 1 that the smart speaker plays as is Xiaoming. If Xiaoming's grandmother is going for a walk and says to the smart speaker "I am going for a walk and have saved a cake for you in the fridge. Remember to eat it." After a preset time, the smart speaker abstracts and summarizes text of the conversations between the different roles and Xiaoming, and then generates a conversation abstract. The abstract may be "your mother reminds you to fish your homework in time and your grandmother saves you a cake in the fridge". The smart speaker may send the conversation abstract to a mobile phone of Xiaoming through communication (for example, an SMS message).

By using the foregoing manner, the smart speaker can recognize that the first voice information is sent by the user 2 and can recognize that the first voice information indicates the smart speaker to "play as" the user 1. In response to the first voice information, the smart speaker may send the response information of the first voice information by imitating the voice of the user 1 and in the mode in which the user 1 has a conversation with the user 2. In this way, the smart speaker can "play as" the user 1 to have a voice conversation with the user 2. Such a voice interaction manner improves interaction performance of the smart speaker and can provide the user 2 with individualized voice interaction experience.

It may be understood that, to implement the foregoing functions, the smart speaker includes a corresponding hardware structure and/or a corresponding software module for implementing each function. A person skilled in the art should be easily aware that, in combination with the examples described in the embodiments disclosed in this specification, units, algorithms, and steps may be implemented by hardware or a combination of hardware and computer software in embodiments of this application. Whether a specific function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of this application.

In embodiments of this application, the smart speaker may be divided into function modules based on the foregoing method examples. For example, each function module may be obtained through division corresponding to each function, or two or more functions may be integrated into one processing module. The integrated module may be implemented in a form of hardware, or may be implemented in a form of a software function module. It should be noted that, in the embodiments of this application, module division is used as an example, and is merely a logical function division. In actual implementation, another division manner may be used.

Figure 4:
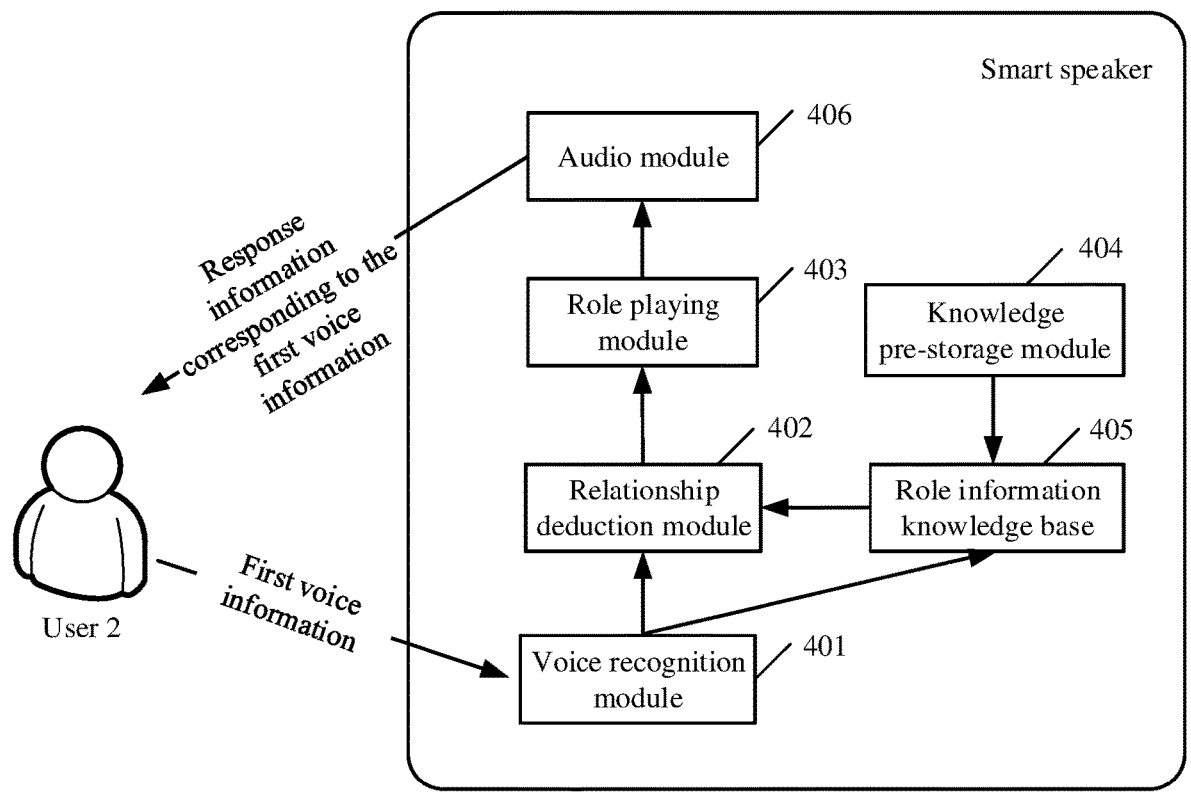
FIG. 4 is a schematic diagram of a structure of a smart speaker according to an embodiment of this application.

FIG. 4 is a schematic diagram of a possible structure of the smart speaker in the foregoing embodiment. The smart speaker may include a voice recognition module 401, a relationship deduction module 402, a role playing module 403, a knowledge pre-storage module 404, a role information knowledge base 405, and an audio module 406. Optionally, the smart speaker may further include a camera module, a communications module, a sensor module, and the like.

The voice recognition module 401 is configured to recognize first voice information received by the smart speaker. The relationship deduction module 402 is configured to deduce, based on a relationship between existing family members, a relationship between a newly recorded person and the existing family members. The role playing module 403 is configured to enable the smart speaker to imitate a voice of a user 1 and send response information corresponding to the first voice information. The knowledge pre-storage module 404 is configured to store information of each user, so that the role playing module 403 obtains user information, to enable the role playing module 403 to generate, based on the user information, response information corresponding to voice information. The role information knowledge base 405 is configured to store conversation information of users and can generate the response information corresponding to the voice information based on the first voice information.

In some embodiments, the smart speaker may further include a summation and abstraction module. The summation and abstraction module is configured to extract a keyword in the conversation information and use the keyword as an abstract of the conversation information, or configured to summarize information of the conversation information. The summation and abstraction module may send the abstract of the conversation information to an intelligent device of the user 1 that the smart speaker "plays as". Alternatively, the communications module in the smart speaker sends, to the intelligent device of the user 1 that the smart speaker "plays as", the keyword that is in the conversation information and that is extracted by the summation and abstraction module.

Units and modules in the smart speaker include but are not limited to the voice recognition module 401, the relationship deduction module 402, the role playing module 403, the knowledge pre-storage module 404, the role information knowledge base 405, the audio module 406, and the like. For example, the smart speaker may further include a storage module. The storage module is configured to store program code and data of the electronic device.

An embodiment of this application further provides a computer-readable storage medium. The computer-readable storage medium stores computer program code. When a processor executes the computer program code, the smart speaker may perform related method steps in FIG. 3A to implement the method in the foregoing embodiments.

An embodiment of this application further provides a computer program product. When the computer program product runs on a computer, the computer is enabled to perform related method steps in FIG. 3A to implement the method in the foregoing embodiments.

The smart speaker, the computer storage medium, or the computer program product provided in the embodiments of this application are all configured to perform the corresponding methods provided above. Therefore, for beneficial effects that can be achieved thereof, refer to the beneficial effects in the corresponding methods provided above. Details are not described herein again.

Based on the foregoing descriptions of the implementations, a person skilled in the art may clearly understand that, for the purpose of convenient and brief description, division into the foregoing function modules is merely used as an example for descriptions. During actual application, the foregoing functions can be allocated to different function modules for implementation based on a requirement, in other words, an inner structure of an apparatus is divided into different function modules to implement all or a part of the functions described above.

In the several embodiments provided in this application, it should be understood that the disclosed apparatus and method may be implemented in other manners. For example, the described apparatus embodiments are merely examples. For example, division into the modules or units is merely logical function division. There may be another division manner in actual implementation. For example, a plurality of units or components may be combined or may be integrated into another apparatus, or some features may be ignored or not be performed. In addition, the displayed or discussed mutual couplings or direct couplings or communication connections may be implemented through some interfaces. The indirect couplings or communication connections between the apparatuses or units may be implemented in electronic, mechanical, or other forms.

In addition, function units in embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions in embodiments of this application essentially, or the part contributing to the current technology, or all or a part of the technical solutions may be implemented in a form of a software product. The software product is stored in a storage medium and includes several instructions for instructing a device (which may be a single-chip microcomputer, a chip, or the like) or a processor to perform all or a part of the steps of the methods described in embodiments of this application. The foregoing storage medium includes: any medium that can store program code, such as a USB flash drive, a removable hard disk, a ROM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A voice interaction method, wherein the method comprises:
    receiving, by an electronic device via a microphone of the electronic device, voice data for a wakeup word and first voice information;
    determining, by the electronic device, based on the voice data for the wakeup word whether to wake up the electronic device from a sleep state to an active state, wherein the voice data for the wakeup word is detected by a second processor of the electronic device and the determining is performed by a first processor of the electronic device in response to a signal from the second processor, wherein the second processor is lower powered than the first processor; and
    when the electronic device is in the active state:
    recognizing, by the electronic device, text of the first voice information in response to said receiving the first voice information, wherein the first voice information indicates a voice conversation with a first user being requested, and wherein the first voice information is sent from a second user; and
    conducting, by the electronic device when it is recognized that the first voice information is voice information of the second user, a voice conversation with the second user by imitating a voice of the first user, wherein the voice conversation is conducted in a previously determined conversation mode in which the first user having a voice conversation with the second user is emulated, and wherein the previously determined conversation mode indicates a tone and phrasing of the first user for conversing with the second user.

2. The method according to claim 1, wherein the previously determined conversation mode is selected from a stored plurality of conversation modes associated with the first user, and wherein the previously determined conversation mode is further associated with the second user or a relationship, deduced by the electronic device, between the first user and the second user.

3. The method according to claim 1, wherein the electronic device stores image information of the first user, and the method further comprises:
    displaying, by the electronic device, the image information of the first user during said conducting.

4. The method according to claim 1, wherein the electronic device stores a facial model of the first user, and the method further comprises:
    displaying, by the electronic device, the facial model by imitating an expression of the first user in the voice conversation with the second user, wherein in the facial model, the expression of the first user changes dynamically during said conducting.

5. The method according to claim 1, wherein before the receiving, by an electronic device, first voice information, the method further comprises:
    obtaining, by the electronic device, second voice information, wherein the second voice information is voice information of the first user in the voice conversation with the second user; and
    analyzing, by the electronic device, the second voice information to obtain a voice feature of the first user in the voice conversation with the second user, and storing the voice feature, wherein
    the voice feature comprises a voiceprint feature, a tone feature, and a phrasing feature, the tone feature indicates a tone of the first user in the voice conversation with the second user, and the phrasing feature indicates a commonly used phrase of the first user in the voice conversation with the second user.

6. The method according to claim 5, wherein the method further comprises:
    storing, by the electronic device in the second voice information, a record of the conversation that the electronic device conducts with the second user by imitating the first user.

7. The method according to claim 1, wherein the conducting, by the electronic device when it is recognized that the first voice information is voice information of a second user, a conversation with the second user by imitating a voice of the first user comprises:
    playing, by the electronic device when it is recognized that the first voice information is the voice information of the second user, a voice response corresponding to the first voice information by imitating the voice of the first user and in the previously determined conversation mode;
    receiving, by the electronic device, third voice information;
    recognizing, by the electronic device, the third voice information in response to said receiving the third voice information; and
    playing, by the electronic device when it is recognized that the third voice information is the voice information of the second user, a voice response corresponding to the third voice information by imitating the voice of the first user and in the previously determined conversation mode.

8. The method according to claim 7, wherein the method further comprises:
    obtaining, by the electronic device, schedule information of the first user, wherein the schedule information indicates a schedule of the first user; and the playing a voice response corresponding to the third voice information comprises:
playing, by the electronic device, the voice response corresponding to the third voice information with reference to the schedule information.

9. The method according to claim 1, wherein the method further comprises:
storing, by the electronic device, a record of the conversation; and
sending, by the electronic device, the record to an electronic device of the first user.

10. The method according to claim 1, wherein the method further comprises:
storing, by the electronic device, a record of the conversation;
extracting, by the electronic device from the record, a keyword in the conversation; and
sending, by the electronic device, the keyword to an electronic device of the first user.

11. The method according to claim 1, wherein the method further comprises:
obtaining, by the electronic device during the conducting, image information and action information of the second user, and storing the image information and the action information.

12. An electronic device comprising a memory, a microphone, a speaker, and a first processor, and a second processor; wherein the memory, the microphone, and the speaker are coupled to the first processor; wherein the memory is configured to store computer program code, and the computer program code comprises computer instructions that, when executed by the first processor, causes the electronic device to perform operations comprising:
receiving, via the microphone, voice data for a wakeup word and first voice information;
determining, based on the voice data for the wakeup word, whether to wake up the electronic device from a sleep state to an active state, wherein the voice data for the wakeup word is detected by the second processor and the determining is performed by the first processor in response to a signal from the second processor, wherein the second processor is lower powered than the first processor; and
when the electronic device is in the active state:
recognizing text of the first voice information in response to receiving the first voice information, wherein the first voice information indicates a voice conversation being requested with a first user, and wherein the first voice information is sent from a second user;
conducting, when it is recognized that the first voice information is voice information of the second user, a voice conversation with the second user by imitating a voice of the first user, wherein the voice conversation is conducted in a previously determined conversation mode in which the first user having a voice conversation with the second user is emulated, and wherein the previously determined conversation mode indicates a tone and phrasing of the first user for conversing with the second user; and
playing, over the speaker, response information corresponding to the first voice information.

13. The electronic device according to claim 12, wherein the electronic device further comprises a display coupled to the first processor, and the display is configured to display image information of the first user during the conducting.

14. The electronic device according to claim 13, wherein the electronic device stores a facial model of the first user; and
wherein the computer program code comprises computer instructions that, when executed by the first processor, causes the electronic device to perform operations comprising displaying, on the display, the facial model by imitating an expression of the first user in the voice conversation with the second user, wherein in the facial model, the expression of the first user changes dynamically during the conducting.

15. The electronic device according to any one of claim 12, wherein the computer program code comprises computer instructions that, when executed by the first processor, causes the electronic device to perform operations comprising:
obtaining, via the microphone, second voice information, wherein the second voice information is voice information of the first user in the voice conversation with the second user; and
analyzing the second voice information to obtain a voice feature of the first user in the voice conversation with the second user, and store the voice feature, wherein the voice feature comprises a voiceprint feature, a tone feature, and a phrasing feature, the tone feature indicates a tone of the first user in the voice conversation with the second user, and the phrasing feature indicates a commonly used phrase of the first user in the voice conversation with the second user.

16. The electronic device according to claim 15, wherein the computer program code comprises computer instructions that, when executed by the first processor, causes the electronic device to perform operations comprising storing, in the second voice information, a record of the conversation that the electronic device conducts with the second user by imitating the first user.

17. The electronic device according to claim 12, wherein the computer program code comprises computer instructions that, when executed by the first processor, causes the electronic device to perform operations comprising:
receiving, via the microphone, third voice information;
recognizing the third voice information in response to said receiving the third voice information; and
playing, via the speaker and when it is recognized that the third voice information is the voice information of the second user, a voice response corresponding to the third voice information by imitating the voice of the first user and in the previously determined conversation mode.

18. The electronic device according to claim 17, wherein the computer program code comprises computer instructions that, when executed by the first processor, causes the electronic device to perform operations comprising obtaining schedule information of the first user, wherein the schedule information indicates a schedule of the first user; and
the playing voice response corresponding to the third voice information comprises:
playing, by the electronic device, the voice response corresponding to the third voice information with reference to the schedule information.

19. The electronic device according to claim 12, wherein the computer program code comprises computer instructions that, when executed by the first processor, causes the electronic device to perform operations comprising: storing a record of the voice conversation; and
sending the record to an electronic device of the first user.

20. The electronic device according to claim 12, wherein the computer program code comprises computer instructions that, when executed by the first processor, causes the electronic device to perform operations comprising:
  store the record of the voice conversation;
  extract, from the record, a keyword in the conversation; and
  send the keyword to an electronic device of the first user.

* * * * *